United States Patent Office 3,702,774
Patented Nov. 14, 1972

3,702,774
MOULD TREATMENT
James Derek Birchall and John Edward Cassidy, Runcorn, England, assignors to Imperial Chemical Industries Limited, London, England
No Drawing. Filed June 18, 1971, Ser. No. 154,610
Claims priority, application Great Britain, June 30, 1970, 31,585/70
Int. Cl. B29c 1/04
U.S. Cl. 117—5.1                        14 Claims

ABSTRACT OF THE DISCLOSURE

A mould surface is coated with a halogen-containing complex phosphate of aluminum containing at least one chemically-bound molecule of a hydroxy compound R—OH, wherein R is a hydrogen atom, an aliphatic group, or a substituted aliphatic group and a dispersant for the complex phosphate.

---

This invention relates to the treatment of surfaces of moulds, especially moulds for use in the production of castings of metal, glass and the like.

In United States patent application Ser. No. 42,499 filed June 1, 1970 (corresponding to Dutch application No. 7008594), we described halogen-containing complex phosphates of aluminium containing at least one chemically-bound molecule of a hydroxy compound R—OH wherein R is a hydrogen atom or an organic group.

We have now found that compositions comprising a complex phosphate described in the aforesaid application may be used to treat the surfaces of moulds used in the production of castings, especially of metal or glass.

Thus according to the present invention there is provided a method for treating the surface of a mould comprising applying to said surface a composition comprising a halogen-containing complex phosphate of aluminium containing at least one chemically-bound molecule of a hydroxy compound R—OH wherein R is a hydrogen atom or an organic group and a dispersant for the complex phosphate.

The term "phosphate" includes phosphate esters and acid phosphates.

Where R is an organic group, it is preferred that it be an aliphatic hydrocarbon group or a substituted aliphatic hydrocarbon group, for example wherein the substituent is one or more of the following: amino, phenyl, hydroxyl, carboxyl or alkoxy. Unsubstituted aliphatic alcohols are especially preferred as the hydroxy compound since complex phosphates according to the invention containing them are easily separated solids obtainable in high yield. We have found that aliphatic alcohols containing one to ten carbon atoms are especially suitable, and owing to their ready availability we prefer to use aliphatic alcohols containing from one to four carbon atoms, for example, methanol, ethyl alcohol, n-propyl alcohol or isopropyl alcohol. In preferred embodiments of the invention, ethyl alcohol is used, as the complex phosphates containing it are especially readily formed as solids in high yield.

The halogen in the halogen-containing complex phosphate of aluminium is preferably chlorine, but the compounds may contain other halogens, for example bromine or iodine.

The ratio of the number of gram atoms of aluminum to the number of gram atoms of phosphorus in the complex phosphates of aluminium may vary over a wide range, for example from 1:2 to 2:1, but is preferably substantially 1:1 as complex phosphates of the invention having this ratio decompose at low temperatures directly to form aluminium orthophosphate having greater chemical stability and refractoriness than aluminium phosphate formed from complex phosphates with other ratios. The ratio of the number of gram atoms of aluminium to the number of gram atoms of halogen in the complex phosphates is preferably substantially 1:1.

The complex phosphates of the invention may be monomeric or polymeric.

The structure of the complex phosphates is not fully understood and some of the chemically-bound hydroxy compounds may be bound as groups—OR rather than as complete molecules.

The monomeric forms, or the repeating units of the polymeric forms of the complex phosphates, may contain, for example, from one to five molecules of the hydroxy compound. Most frequently the number of molecules of the hydroxy compound is 4. In some cases the complex phosphates may contain molecules of different hydroxy compounds, for example they may contain both chemically-bound water and a chemically-bound organic hydroxy compound, the total number of such molecules being, for examples, from 2 to 5.

An example of a complex phosphate according to the invention is the complex phosphate containing ethyl alcohol and having the empirical formula $AlPClH_{25}C_8O_8$. The infrared and X-ray characteristics of the compound are described in Example 1 of the aforesaid co-pending application. This compound is designated aluminium chlorophosphate ethanolate, for convenience referred to herein as ACPE, but it is to be understood that this designation in no way implies any particular molecular structure for the compound.

An example of a complex phosphate containing chemically-bound water is the complex phosphate containing chemically-bound water having the empirical formula $AlPClH_{11}O_9$. The infra-red and X-ray characteristics of the compound are described in Example 6 of the aforesaid co-pending application. This compound is designated aluminium chloro-phosphate hydrate, for convenience referred to as ACPH, but it is to be understood that this designation in no way implies any particular molecular structure for the compound.

A further example of a complex phosphate is that containing bromine and ethyl alcohol having an empirical formula $AlPBrH_{25}C_8O_8$. The infra-red and X-ray characteristics of the compound are described in Example 7 of the aforesaid co-pending application. This compound is designated aluminium bromo-phosphate ethanolate, for convenience referred to as ABPH, but it is to be understood that this designation in no way implies any particular molecular structure for the compound.

The dispersant, generally a liquid dispersant, is preferably a solvent for the complex phosphate although it may be dispersed in the dispersant, for example as a suspension, sol or gel.

Suitable solvents include polar solvents, for example methyl alcohol, ethyl alcohol, isopropyl alcohol, ethylene glycol, monoethyl ether or water, or a mixture of two or more such solvents. Solutions of ACPE in water or an alcohol, for example isopropyl alcohol or of ACPH in water are especially useful as the compositions for the method of the invention.

For some embodiments it is preferred that the composition applied to the mould surface comprises additionally a finely-divided refractory material. The refractory material is preferably a powdered form of silica, alumina, magnesia, zirconium silicate, zirconia, sillimanite, aluminium phosphate graphite or crushed coke or mixtures thereof. The particle size of the refractory powder may be varied over a wide range, but for most embodiments a fine powder, substantially the whole of which passes a 300 British Standard Sieve, is preferred.

Preferred compositions used in the method may contain a suspending agent, for example bentonite clay, an alcohol-soluble organic polymer, typically hydroxy-propyl cellulose, or a water-soluble organic polymer, typically carboxymethyl cellulose.

Optionally, the compositions applied to the mould surface may contain binding agents, fillers or lubricant materials, or a composition may be used in admixture with another mould dressing material.

The relative proportions of the components of the compositions used in the method may vary widely, depending, for example, upon the particular material from which castings are to be made. Compositions preferably contain at least 1% by weight of complex phosphate, more preferably from 5% by weight to a percentage by weight sufficient to saturate the solvent or solvent mixture, for example from 10% by weight to 80% by weight. In embodiments where a refractory powder is included in the composition, concentrations from 1% by weight to 60% by weight, preferably from 10% by weight to 40% by weight, may be employed. A suspending agent, if used, may be present in any proportion necessary to prevent settling of the refractory material in a composition containing it on standing, but we find that normally 0.1% to 5% by weight is sufficient. Compositions especially convenient for applying to, for example, silicate-bound sand moulds have proportions in parts by weight in the following ranges:

| | |
|---|---|
| Complex phosphate | 5–15 |
| Solvent | 10–40 |

When a refractory powder is included in the composition, proportions in the following ranges may conveniently be used:

| | Percent by weight |
|---|---|
| Complex phosphate | 5–80 |
| Solvent | 10–95 |
| Refractory powder | 5–50 |

For example:

| | |
|---|---|
| ACPE | 18.5 |
| Isopropyl alcohol | 55.5 |
| Carbon black | 26.0 |

The compositions used in the method may be prepared by mixing the ingredients together, or, if a solid is included, conveniently by preparing a binder comprising the complex phosphate and solvent and incorporating the solid, for example a refractory powder, into the binder. In some embodiments, it will be preferable to formulate a concentrate of a composition which may be diluted with the solvent or other appropriate thinner before use.

The composition may be applied to the mould surface by any convenient method, for example dipping, spraying, swabbing or brushing.

The coated mould may be further treated to remove solvent, preferably by drying, either by heating the mould or subjecting it to a vacuum or both. Low boiling solvents such as ethanol may be removed readily by standing the mould in warm air. When water is used as solvent, drying in an oven at a temperature of at least 100° C. is convenient. In some embodiments, inflammable solvent may be removed by burning it off.

Optionally the coated mould may be subjected to a stage of further heating, for example to further harden the coating composition. It is preferred to use a temperature from 200° C. to 1200° C., for this further heating; a time of from ½ hour to 1 hour is usually sufficient.

The mould may be treated, if desired, by building up successive layers of composition, preferably allowing each layer to dry before applying the next.

The method of the invention is especially useful for treating moulds used for casting metals or glass.

Sand moulds and cores used in the metal castings industry, for example sodium silicate —$CO_2$ bonded or resin-bonded moulds and cores, can very conveniently be treated without the deleterious softening frequently associated with the use of water-based mould dressings. In some cases when using a mould with a core, treatment of the core alone is sufficient and the term "mould" as used herein includes such cores. Moulds treated according to the invention exhibit reduced sand/metal reaction ("burn-on"), reduced metal penetration and increased ease of mould release.

Metal moulds used, for example, for casting glass or die-casting metal may conveniently be treated by the method of the invention. Moulds thus treated need less frequent re-treatment than moulds treated with known mould dressings.

The invention is illustrated in the following examples.

In all cases the binder used was that previously described as ACPE and obtained by the method of Example 1 of the abovementioned application.

Examples 1–9

Various coatings were formulated and applied to give different sand cores each measuring 50 mm. in diameter by 50 mm. in height and, with the exception of those made by the hot box process, were made by compacting the various sand/binder mixtures using three blows of a GF standard rammer (in which a 7 kg. weight falls through a height of 50 mm.). The hot box specimens were made by blowing the sand/resin mixture into heated core boxes. Details of these sand mixtures and the various methods of curing and hardening are given below. All mixtures are based on Erith silica sand and and the percentage figures for additions quoted are based on the initial weight of silica sand in the mixture.

(a) Linseed oil cores.—Bonded with—1% linseed oil, 2% GB Kordek, 3% water. Cores were baked for 90 minutes at 230° C.

(b) Clay-bonded cores. — Bonded with 5% Western bentonite, 3% water. Dried for 120 minutes at 110° C.

(c) $CO_2$-silicate cores.—Bonded with 4% of C112 grade sodium silicate, gassed for 1 minute at a flow-rate of 2.5 l./m. at a pressure of 10 lb./in.$^2$.

(d) Self-set silicate cores.—Bonded with 4% H100 grade sodium silicate and hardened with 0.4% Ashland 3100 grade catalyst.

(e) Hot box resin cores.—Bonded with 2% Sanset A resin and 0.3% catalyst. Cured for 30 seconds at 240° C.

Test castings were made using different metals by pouring iron at 1400° C. into moulds having the abovementioned cores to give a semi-cylindrical design having a wall thickness of 45 mm. and a height of 100 mm. The moulds were formed from a Bromsgrove red natural clay-bonded moulding sand mixture containing 6% coal dust.

When cold, the castings were removed from the moulds, the cores removed and the castings were shot-blasted for 10 seconds after which they were examined for surface finish and the presence of burn-on, penetration and finning defects.

The results are shown in the table in which the severity of defects is marked on the basis that 0 corresponds to an excellent surface finish free from defect, and 3 corresponds to the presence of a severe defect. For the purposes of comparison castings were also made without any coating on the core. The results are also shown in the table.

The coatings were as follows:

Example 1

ACPE dissolved in isopropanol (5% based on the weight of isopropanol) mixed with 6.5% water and 25% alumina by volume of ACPE plus isopropanol.

Example 2

As for Example 1, with alumina replaced by zircon.

Example 3

As for Example 1, with alumina replaced by coke-dust.

Example 4

As for Example 1, with alumina replaced by an equivolume mixture of zircon and graphite.

Example 5

As for Example 4, with the water omitted.

Example 6

ACPE dissolved in water (200% based on the weight of water) mixed with 25% of an equivolume mixture zircon and graphite by volume of ACPE plus water.

Example 7

As for Example 3, with the water omitted.

Example 8

As for Example 6, with the zircon/graphite replaced by coke-dust.

Example 9

As for Example 5, except the ACPE concentration was 10% instead of 5%.

The coatings were applied to the core by brushing, after which those containing isopropanol were ignited and those containing no isopropanol were dried at 110° C.

One coat was applied in all cases, except in Example 7 in which the core received two coatings.

TABLE

|  | 1 | 2 | 3 | 4 | 5 | 6 | 7 | 8 | 9 | No coating |
|---|---|---|---|---|---|---|---|---|---|---|
| Linseed oil bonded: | | | | | | | | | | |
| Metal penetration | 0 | 0 | 0 | 0 | 0 | 0 | 0 | 0 | 0 | 2 |
| Finning | 1 | 1 | 1 | 1 | 1 | 1 | 0 | 0 | 1 | 2 |
| Burn-on | 0 | 0 | 0 | 0 | 0 | 0 | 0 | 0 | 0 | 1 |
| Surface finish | 1 | 1 | 1 | 0 | 0 | 0 | 1 | 1 | 0 | 1 |
| Clay bonded: | | | | | | | | | | |
| Metal penetration | 0 | 0 | 1 | 0 | 1 | 0 | 0 | 0 | 0 | 0 |
| Finning | 0 | 0 | 0 | 0 | 0 | 0 | 0 | 0 | 0 | 0 |
| Burn-on | 0 | 0 | 0 | 0 | 0 | 0 | 0 | 0 | 0 | 1 |
| Surface finish | 1 | 1 | 1 | 0 | 0 | 1 | 1 | 1 | 0 | 2 |
| $CO_2$-silicate bonded: | | | | | | | | | | |
| Metal penetration | 0 | 0 | 0 | 0 | 0 | 0 | 0 | 0 | 0 | 1 |
| Finning | 0 | 0 | 0 | 0 | 0 | 0 | 0 | 0 | 0 | 0 |
| Burn-on | 0 | 1 | 0 | 0 | 0 | 0 | 0 | 0 | 0 | 3 |
| Surface finish | 1 | 1 | 1 | 1 | 0 | 0 | 2 | 0 | 0 | 3 |
| Self-setting silicate bonded: | | | | | | | | | | |
| Metal penetration | 1 | 0 | 0 | 0 | 0 | 0 | 0 | 0 | 0 | 1 |
| Finning | 0 | 0 | 0 | 0 | 0 | 0 | 0 | 0 | 0 | 0 |
| Burn-on | 1 | 1 | 0 | 0 | 0 | 0 | 0 | 0 | 0 | 2 |
| Surface finish | 1 | 1 | 1 | 0 | 1 | 0 | 2 | 0 | 0 | 3 |
| Hot box resin bonded: | | | | | | | | | | |
| Metal penetration | 1 | 0 | 0 | 0 | 0 | 0 | 0 | 0 | 0 | 0 |
| Finning | 2 | 0 | 1 | 1 | 1 | 1 | 1 | 1 | 0 | 1 |
| Burn-on | 1 | 0 | 0 | 0 | 0 | 0 | 0 | 0 | 0 | 1 |
| Surface finish | 1 | 0 | 0 | 0 | 0 | 0 | 1 | 0 | 0 | 2 |

We claim:

1. A method for treating the surface of a mould comprising applying to said surface a composition comprising a halogen-containing complex phosphate of aluminium containing at least one chemically-bound molecule of a hydroxy compound R—OH wherein R is a hydrogen atom, an aliphatic group, or a substituted aliphatic group and a dispersant for the complex phosphate.

2. A method according to claim 1 in which the ratio of the number of gram atoms of aluminium to the number of gram atoms of phosphorus in the complex phosphate is at least 1:1.

3. A method according to claim 2 in which the ratio equal to 1:1.

4. A method according to claim 1 in which the hydroxy compound of the complex phosphate is an aliphatic alcohol containing 1 to 10 carbon atoms.

5. A method according to claim 4 in which the hydroxy compound is an aliphatic alcohol containing 1 to 4 carbon atoms.

6. A composition according to claim 5 in which the alcohol is ethyl alcohol.

7. A composition according to claim 1 in which the halgen of the complex phosphate is chlorine.

8. A method according to claim 1 in which the complex phosphate contains four molecules of chemically-bound ethyl alcohol and has the empirical formula $AlPClH_{25}C_8O_8$.

9. A method according to claim 1 in which the complex phosphate contains five molecules of chemically-bound water and has the empirical formula $AlPClH_{11}O_9$.

10. A method according to claim 1 in which the dispersant for the complex phosphate is a solvent for it.

11. A method according to claim 10 in which the solvent is a polar solvent.

12. A method according to claim 11 in which the solvent is selected from the group consisting of methyl alcohol, ethyl alcohol, isopropyl alcohol, ethylene glycol, monoethyl ether and water.

13. A method according to claim 1 in which the composition also includes a refractory powder.

14. A method according to claim 13 in which the refractory powder is selected from the group consisting of silica, alumina, magnesia, zirconium silicate, zirconia, sillimanite, aluminium phosphate, graphite and crushed coke.

References Cited

UNITED STATES PATENTS

| | | | |
|---|---|---|---|
| 2,885,417 | 5/1959 | Heyden | 260—448 R |
| 3,052,629 | 9/1962 | Morrow et al. | 106—38.22 X |
| 3,243,397 | 3/1966 | Herkimer et al. | 106—38.22 X |
| 3,164,622 | 1/1965 | Newlands | 106—38.22 X |

FOREIGN PATENTS

| | | | |
|---|---|---|---|
| 7008594 | 12/1970 | Netherlands | 260—448 R |
| 1,522,560 | 9/1969 | Germany | 260—448 R |

MURRAY KATZ, Primary Examiner

M. R. P. PERRONE, JR., Primary Examiner

U.S. Cl. X.R.

106—38.22; 117—5.2, 5.3, 121